United States Patent
Savchenkov et al.

(10) Patent No.: US 7,535,634 B1
(45) Date of Patent: May 19, 2009

(54) OPTICAL DEVICE, SYSTEM, AND METHOD OF GENERATING HIGH ANGULAR MOMENTUM BEAMS

(75) Inventors: Anatoliy A. Savchenkov, Glendale, CA (US); Andrey B. Matsko, Pasadena, CA (US); Dmitry V. Strekalov, Arcadia, CA (US); Ivan S. Grudinin, Pasadena, CA (US); Lute Maleki, Pasadena, CA (US)

(73) Assignee: The United States of America as represented by the National Aeronautics and Space Administration, Washington, DC (US)

( * ) Notice: Subject to any disclaimer, the term of this patent is extended or adjusted under 35 U.S.C. 154(b) by 222 days.

(21) Appl. No.: 11/675,690

(22) Filed: Feb. 16, 2007

Related U.S. Application Data

(60) Provisional application No. 60/774,255, filed on Feb. 16, 2006.

(51) Int. Cl.
H01S 3/08 (2006.01)
(52) U.S. Cl. .......................... 359/346; 372/92; 372/98; 385/43
(58) Field of Classification Search ............... 385/43; 372/92, 98; 359/346
See application file for complete search history.

(56) References Cited

U.S. PATENT DOCUMENTS

| | | | |
|---|---|---|---|
| 4,474,429 A * | 10/1984 | Yoldas et al. ............... 385/43 |
| 6,490,039 B2 * | 12/2002 | Maleki et al. ............... 356/436 |
| 6,633,696 B1 * | 10/2003 | Vahala et al. ............... 385/27 |
| 6,978,067 B2 * | 12/2005 | Herbert et al. ............... 385/39 |
| 2002/0044739 A1 * | 4/2002 | Vahala et al. ............... 385/30 |
| 2003/0063426 A1 * | 4/2003 | Smirnov et al. ............... 361/159 |
| 2004/0218880 A1 | 11/2004 | Matsko et al. | |
| 2005/0128566 A1 | 6/2005 | Savchenkov et al. | |

OTHER PUBLICATIONS

Shortt et al, "Characterization of Er:ZBNA microspherical lasers", SPIE vol. 5827 Opto-Ireland 2005: Photonic Engineering, pp. 47-57, (Jun. 2005).*

Little et al, "Analytic Theory of Coupling from Tapered Fibers and Half-Blocks into Microsphere Resonators", Journal of Lightwave Technology, vol. 17, No. 4, pp. 704-715, (Apr. 1999).*

* cited by examiner

Primary Examiner—Eric Bolda
(74) Attorney, Agent, or Firm—Mark Homer

(57) ABSTRACT

An optical device, optical system, and method of generating optical beams having high angular momenta are provided. The optical device includes a whispering gallery mode resonator defining a resonator radius and an elongated waveguide having a length defined between a first end and a second end of the waveguide. The waveguide defines a waveguide radius which increases at least along a portion of the length of the waveguide in a direction from the first end to the second end. The waveguide radius at the first end of the waveguide is smaller than the resonator radius and the resonator is integrally formed with the first end of the waveguide.

20 Claims, 1 Drawing Sheet

OPTICAL DEVICE, SYSTEM, AND METHOD OF GENERATING HIGH ANGULAR MOMENTUM BEAMS

CROSS REFERENCE TO RELATED APPLICATION

The present application claims the benefit from earlier filed U.S. Provisional Patent Application No. 60/774,255, filed Feb. 16, 2006, which is incorporated herein in its entirety by reference.

STATEMENT AS TO FEDERALLY-SPONSORED RESEARCH

The invention described herein was made in the performance of work under a NASA contract, and is subject to the provisions of Public Law 96-517 (U.S.C. 202), in which the Contractor has not elected to retain title.

FIELD OF THE INVENTION

The present teachings relate to an optical device, system, and method of generating optical beams having high angular momenta. In particular, the present teachings relate to the utilization of whispering gallery mode resonators to transform plane electromagnetic waves into high-order Bessel beams.

BACKGROUND OF THE INVENTION

Optical vortices or light beams with non-zero angular momenta are interesting not only because of their underlying physics, but also because of their potential applications. Potential areas of application include biology, nanotechnology, and communications.

Conventionally used methods of generating beams having a high angular momentum are complicated and require optical setups utilizing holograms, modulating Fabri-Perot cavities, or special microstructures. As a result, generation of beams with orbital momentum up to and exceeding $10^4$ h per photon, though in principle possible, is not easily achievable experimentally. Thus far it has been reported that the highest orbital angular momenta of photons are approximately 25 h and 30 h, and beams with angular momenta of up to 300 h have been demonstrated.

Accordingly, there continues to exist a need for devices and methods that can generate high angular momentum optical beams that are simple to manufacture and easy to implement.

SUMMARY OF THE INVENTION

The present teachings disclose an optical device, an optical system, and a method of generating optical beams having high angular momenta.

According to an embodiment, an optical device includes an optical resonator configured to support whispering gallery modes. The optical resonator defines a resonator radius measured perpendicularly from a longitudinal axis of the optical device to a surface of the optical resonator. The optical device also includes an elongated waveguide having a length defined between a first end and a second end of the waveguide and having a waveguide radius as measured from the longitudinal axis to a surface of the waveguide. The radius of the waveguide increases at least along a portion of the length of the waveguide in a direction from the first end to the second end. The waveguide radius at the first end of the waveguide is smaller than the resonator radius and the optical resonator is integrally formed with the first end of the elongated waveguide.

According to another embodiment, an optical device includes an optical resonator configured to support whispering gallery modes. The optical resonator has a resonator radius measured perpendicularly from a longitudinal axis of the optical device to a surface of the optical resonator. The optical device also includes a fiber rod having a first end and a second end, the first end is integrally formed with the optical resonator along the longitudinal axis of the optical device. An outer surface of the optical device is cylindrically symmetric along the longitudinal axis, whereby a radius as measured from the longitudinal axis to the surface of the optical device at the first end of the fiber rod is smaller than the resonator radius and the radius of the fiber rod increases at least along a portion of a length of the fiber rod in a direction from the first end to the second end.

According to yet another embodiment, a method of generating optical beams having high angular momenta includes coupling electromagnetic waves into a whispering gallery mode resonator defining a resonator radius to excite the modes of the whispering gallery mode resonator. The modes of the whispering gallery mode resonator are propagated into a tapered waveguide integrally formed with the resonator, the tapered waveguide having a radius at a tapered end that is smaller than the radius of the whispering gallery mode resonator. The modes are then propagated through the tapered waveguide and transformed into optical beams having high angular momenta. The optical beams having high angular momenta are then emitted from an opposite end of the tapered waveguide.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

The present teachings are directed to an optical device and system that are capable of generating optical beams having high angular momenta. The present teachings are also directed to a method of generating optical beams having high angular momenta. The generated high angular momenta optical beams can possess a Bessel-related geometry of any order.

Figure 1:
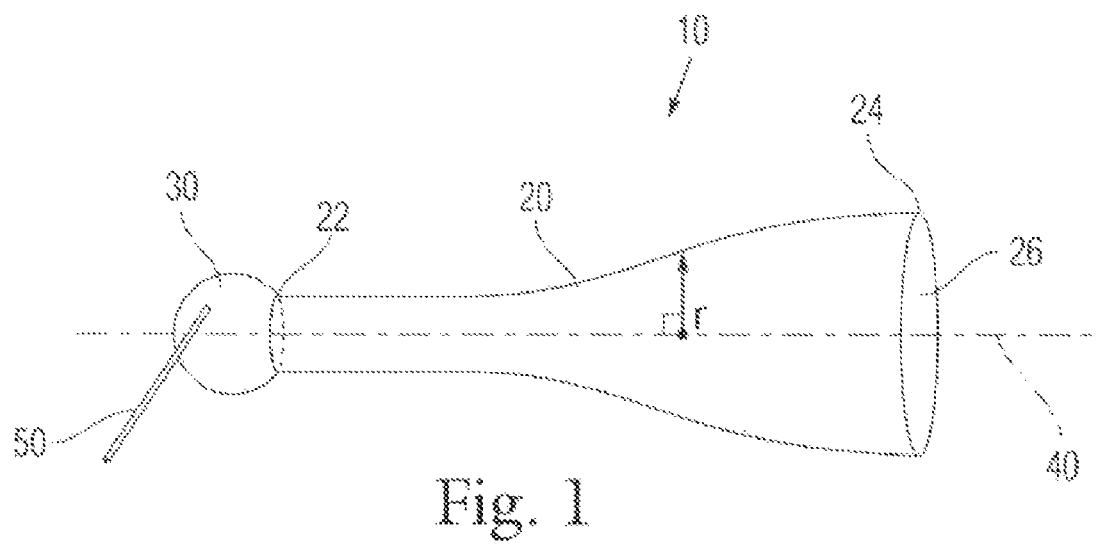
FIG. 1 is a perspective view of an embodiment of the optical device and system of the present teachings.

Referring to FIG. 1, an exemplary optical device 10 of the present teachings is shown. The optical device 10 can include a waveguide 20 in the form of a multimode fiber rod having a first end 22 and a second end 24. A whispering gallery mode resonator (WGMR) 30 can be arranged at the first end 22 of the waveguide 20. The WGMR 30 and the waveguide 20 can form a one-piece, integral structure.

The optical device 10 has a longitudinal axis 40 and the exterior surfaces of the WGMR 30 and the waveguide 20 possess cylindrical symmetry along the longitudinal axis 40. That is, any radius, r, of the optical device 10 as measured perpendicularly from the longitudinal axis 40 to the surface of the optical device 10 at any one point is the same around the longitudinal axis 40, while the magnitude of the radius, r, can change when moving along the length longitudinal axis 40.

Figure 2:
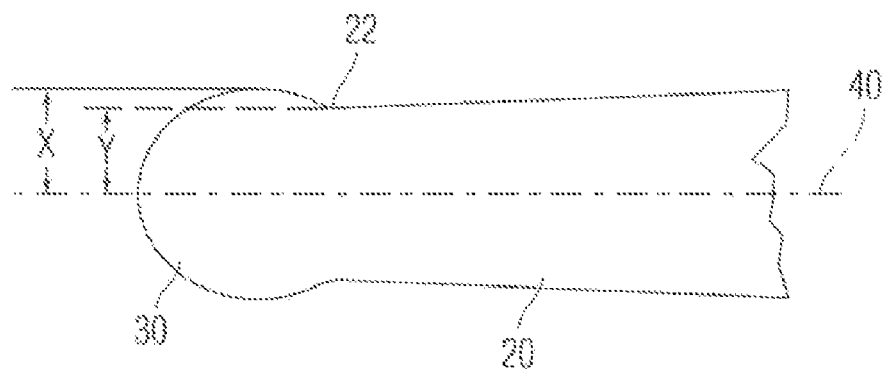
FIG. 2 is a close-up view of one end of an optical device of the type shown in FIG. 1.

The WGMR 30 of the optical device 10 can have any shape as long as it possesses cylindrical symmetry with the waveguide 20 along the longitudinal axis 40. For example, the WGMR 30 can have a generally spheroidal shape as shown in FIG. 1 or a generally disc-like shape. As shown in FIG. 2, the WGMR 30 defines a resonator radius, X, which is measured perpendicularly from the longitudinal axis 40 to the surface of the WGM 30. The resonator radius, X, can be defined by the longest distance from the longitudinal axis 40 to the surface of the WGM 30.

As shown in FIG. 1, the waveguide or fiber rod 20 of the optical device 10 has a tapered or conical-like shape. The radius, r, as measured perpendicularly from the longitudinal axis 40 to the surface of the waveguide 20 increases along at least a portion of the length of the waveguide 20 in a direction from the first end 22 to the second end 24. The tapered shape of the waveguide 20 can be continuous or discontinuous along the length of the waveguide 20.

Referring to both FIGS. 1 and 2, at the point that the fiber rod 20 merges with or attaches to the WGMR 30, a neck is formed. At this neck, the fiber rod 20 has a radius, Y, which is smaller than the resonator radius, X. In an exemplary embodiment, the WGMR 30 can have a radius, X, of about 150 μm while the end of the fiber rod 20 at its attachment point to the WGMR 30 can have a radius, Y, of about 125 to about 140 μm. In this exemplary embodiment, the radius of the fiber rod 20 can increase to about 0.5 mm over about a 1 cm distance as measure from the first end 22 of the fiber rod 20. In another exemplary embodiment, the WGMR 30 can have a radius, X, of about 250 μm, and the radius of the fiber rod 20 can increase from about 225 μm to about 1.5 mm over about a 3 cm distance from the first end 22 of the fiber rod 20.

As shown in FIG. 1, the second end 24 of the fiber rod 20 can be cleaved to form a cleavage plane or surface 26. The cleavage plane 26 can extend substantially perpendicularly with respect to the longitudinal axis 40 of the optical device 10. The cleavage plane 26 can be polished.

The optical device 10 of the present teachings can be made by cutting and polishing a bump or dip pattern on one end of a cylindrical fiber rod waveguide. In another embodiment, one end of a cylindrical fiber rod can be stretched into a conical shape in a burner, and this end of the rod can then be fused to the WGMR 30. In these embodiments, the opposite end of the cylindrical fiber rod can be cleaved and then polished.

The optical device 10 of the present teachings can be made from an optically transparent, electro-optic material. In an exemplary embodiment, the composition of the WGMR 30 and/or the waveguide 20 can include lithium niobate ($LiNbO_3$), lithium tantalate ($LiTaO_3$), sapphire ($Al_2O_3$), silica ($SiO_2$) and/or calcium fluoride ($CaF_2$). Preferably, the composition of the components can include calcium fluoride ($CaF_2$) or silica ($SiO_2$). Most preferably, both of the WGMR 30 and the waveguide 20 are made substantially entirely from fused silica ($SiO_2$).

The optical device 10 of the present teachings can be coupled with optical energy, such as, for example, electromagnetic waves, to create optical vortices or light beams having high angular momenta. As shown in FIG. 1, a coupler 50 can be arranged in optical communication with the WGMR 30 of the optical device 10 to form an optical system of the present teachings. According to various embodiments, the coupler 50 can be any device capable of producing an evanescent field, such as, for example, a pigtailed fiber coupler, a tapered fiber, a prism, an angle-polished fiber tip, and the like.

During operation, the coupler 50 can pump or couple optical energy, such as electromagnetic waves, into the WGMR 30 of the optical device 10. Coupling can be achieved by directing light, such as, for example, light emitted from a laser at 650 nm, into the coupler 50 so that total internal reflection occurs at the distal end of the coupler 50.

Total internal reflection at the distal end of the coupler 50 results in the emission of an evanescent field from the coupler 50. At least a portion of the emitted evanescent field can be pumped or coupled into the WGMR 30 of the optical device 100. Light that couples into the WGMR 30 undergoes total internal reflection within the WGMR 30. Total internal reflection within the WGMR 30 increases the angular momentum of the photons and excites the whispering gallery modes of the WGMR 30.

The whispering gallery modes of the WGMR 30 then decay into the tapered fiber rod 20 of the optical device 10. This occurs as a result of the shape characteristics of the optical device 10 as set forth above and because the fiber rod 20 can support many different modes. One kind of mode supported by the fiber rod 20 is one having a high angular momentum, such as, for example, a beam having a Bessel-related geometry, such as, a truncated Bessel beam. As the modes of the WGMR 30 decay into the tapered fiber rod 20, light propagates through the fiber rod 20 and is transformed into high angular momentum beams. The tapering shape of the waveguide or fiber rod 20 changes the wave vector of the light propagating through the waveguide 20, guaranteeing the escape of light from the waveguide 20. High angular momentum beams exit from the polished end surface 26 of the fiber rod 20 into free space as high-order Bessel beams. The steeper the taper of the fiber rod 20, the easier it is for the high-order Bessel beams to exit from the optical device 10. The optical device 10 of the present teachings can generate Bessel beams in free space with orders of $10^3$ h per photon, and up to and exceeding $10^5$ h per photon.

In contrast, a high order running Bessel wave that penetrates into a cylindrical waveguide having a constant radius (i.e. having a non-tapered cylinder shape) is constrained within the waveguide. The wave would run until the end of the waveguide and reflect because of the total internal reflection. It would be possible to manipulate the waves within such a waveguide, however, the confinement of the waves within the waveguide reduces the spectrum of their applications.

In the optical device 10 of the present teachings, the formation of a tapered waveguide 20 allows the release of high angular momenta beams from the cleaved surface 26 of the waveguide 20 into free space. For example, when a ratio of the radius of the waveguide 20 at its first end 22 to the radius at its second end 24 is relatively small (i.e. $r_{exit}/r_{entrance}=6$ or less) and the mode order is high ($>10^3$), the propagation distance of Bessel beams in free space is less than about ten millimeters. However, by increasing this ratio it is possible to achieve a propagation distance of more than about a centimeter in free space with the optical device 10 of the present teachings. The number of applications for optical waves possessing angular momenta directly depends on their propagation distance in free space. As a result, the optical device 10 of the present teachings has uses in a relatively large number of applications.

As the high angular momenta beams release into free space from the waveguide 20 of the optical device 10, the beams spread out creating peculiar interference shapes and patterns. The interference patterns occur due to the co-propagating, high-order truncated Bessel beams. These beams have a certain similarity with the interference pattern of zero and first order Laguerre-Gauss beams. In addition to the formation of interference shapes and patterns, it has been noticed that peculiar shapes are formed from a shadow of a straight, thin, opaque object that is placed parallel to the surface of the waveguide 20 that crosses the symmetry axis of the emitted high angular momenta beams. The shadow is orthogonal to the object in the center of the interference pattern, and is parallel, but displaced, far from the center. The shape of the shadow depends on the distance of the object from the surface of the taper of the waveguide 20. The closer the object is, the longer is the region of the orthogonal shadow.

The optical device 10 of the present teachings provides a "low contrast" whispering gallery mode (WGM) resonator that supports modes with high angular momenta. By "low contrast" it is meant that the WGMR 30 is a part of the waveguide 20, but has at least a slightly different radius than the waveguide 20. The optical device 10 of the present teachings is different from known WGM resonators since its modes decay primarily into Bessel modes within the waveguide 20 of the optical device 10, and not to the outside environment. By adjusting the geometrical proportions and shape of the WGMR 30, as well as the tapering radius of the waveguide, it is possible to change the loading of the WGMR 30, thereby generating a variety of optical beams with a wide range of parameters that describe those beams.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. An optical device comprising:
   an optical resonator configured to support whispering gallery modes, the optical resonator defining a resonator radius measured perpendicularly from a longitudinal axis of the optical device to a surface of the optical resonator; and
   an elongated waveguide having a length defined between a first end and a second end of the waveguide and defining a waveguide radius as measured from the longitudinal axis to a surface of the waveguide, the radius of the waveguide increasing at least along a portion of the length of the waveguide in a direction from the first end to the second end;
   wherein the waveguide radius at the first end of the waveguide is smaller than the resonator radius and the optical resonator is integrally formed with the first end of the elongated waveguide.

2. The optical device of claim 1, wherein the second end of the waveguide includes a surface that extends substantially perpendicularly to the longitudinal axis of the optical device.

3. The optical device of claim 2, wherein the surface at the second end of the elongated waveguide is a polished surface.

4. The optical device of claim 1, wherein the waveguide is made of fused silica.

5. The optical device of claim 4, wherein the optical resonator is made of fused silica.

6. The optical device of claim 1, wherein the waveguide is a multimode fiber rod.

7. The optical device of claim 1, wherein the optical resonator is generally spherically shaped.

8. The optical device of claim 1, wherein the optical resonator is generally disc shaped.

9. An optical system incorporating the optical device as claimed in claim 1, comprising an optical coupler located relative to the optical resonator and capable of coupling optical energy into the optical resonator.

10. A method of generating optical beams having high angular momenta comprising:
    providing the optical device as claimed in claim 1; and
    coupling optical energy into the optical resonator to excite the modes of the resonator and transform the modes into optical beams having high angular momenta within the elongated waveguide and emitted from the second end of the waveguide.

11. An optical device comprising:
    an optical resonator configured to support whispering gallery modes and having a resonator radius measured perpendicularly from a longitudinal axis of the optical device to a surface of the optical resonator; and
    a fiber rod having a first end and a second end, the first end being integrally formed with the optical resonator along the longitudinal axis of the optical device;
    wherein an outer surface of the optical device is cylindrically symmetric along the longitudinal axis, whereby a radius as measured from the longitudinal axis to the surface of the optical device at the first end of the fiber rod is smaller than the resonator radius and the radius of the fiber rod increases at least along a portion of a length of the fiber rod in a direction from the first end to the second end.

12. The optical device of claim 11, wherein the second end of the fiber rod forms a surface that extends substantially perpendicularly to the longitudinal axis of the optical device.

13. The optical device of claim 12, wherein the surface at the second end of the fiber rod is a polished surface.

14. The optical device of claim 11, wherein the fiber rod is made of fused silica.

15. The optical device of claim 14, wherein the optical resonator is made of fused silica.

16. The optical device of claim 11, wherein the optical resonator is generally spherically shaped.

17. The optical device of claim 11, wherein the optical resonator is generally disc shaped.

18. An optical system incorporating the optical device as claimed in claim 11, comprising an optical coupler located relative to the optical resonator and capable of coupling optical energy into the optical resonator.

19. A method of generating optical beams having high angular momenta comprising:
    providing the optical device as claimed in claim 11; and
    coupling optical energy into the optical resonator to excite the modes of the resonator and transform the modes into optical beams having high angular momenta within the fiber rod and emitted from the second end of the fiber rod.

20. A method of generating optical beams having high angular momenta comprising:
    coupling electromagnetic waves into a whispering gallery mode resonator defining a resonator radius to excite the modes of the whispering gallery mode resonator;
    propagating the modes of the whispering gallery mode resonator into a tapered waveguide integrally formed with the resonator, the tapered waveguide having a radius at a tapered end that is smaller than the radius of the whispering gallery mode resonator;
    propagating the modes through the tapered waveguide and transforming the modes into optical beams having high angular momenta; and
    emitting the optical beams having high angular momenta from an opposite end of the tapered waveguide.

* * * * *